INVENTOR.
SONOSUKE NAGATO

United States Patent Office 3,495,297
Patented Feb. 17, 1970

3,495,297
**DEVICE FOR CONTINUOUSLY PRESSURE-
TREATING BELT-LIKE ARTICLES**
Sonosuke Nagato, Kobe, Japan, assignor to Kabushiki
Kaisha Ashihara Tekkosho, Hyogy-ku, Kobe, Japan, a
company of Japan
Filed Oct. 19, 1967, Ser. No. 676,463
Int. Cl. B29h 7/22
U.S. Cl. 18—6                            5 Claims

ABSTRACT OF THE DISCLOSURE

A device for making elongated belt-like articles affording means for continuously subjecting the article to relatively high pressure during heating or cooling steps.

This invention relates to a device for continuously subjecting successive portions of belt-like articles to relatively high pressure while the articles are either being heated or cooled.

Known devices for fabricating belts, and, particularly, rubber belts, embody vulcanizing means using drums and an endless steel belt to apply continuous pressure while the belt is being heated. The pressure that can be developed by the application of tension to an endless steel belt is generally limited to about 5 kg./cm.$^2$ and it is normally difficult to materially increase that pressure. In the case of a rubber belt requiring materially higher pressures during the heat treatment, for instance, pressures of the order of 20 kg./cm.$^2$, known devices are not satisfactory and the pressure is normally produced by a suitable flat bed press. The use of a press does not permit efficient and continuous treatment and thus the resultant article will not have a uniform contour throughout its length.

One of the objects of this invention resides in the provision of a novel and improved device which will overcome the aforementioned difficulties of prior devices and afford means utilizing a pressure applying mechanism in addition to an endless steel belt so that the elongated belt-like articles being thermally treated can also be subjected to continuous pressure of the order of 20 kg./cm.$^2$ and greater.

Another object of the invention resides in the provision of a novel and improved device for increasing the pressure beyond that normally obtainable utilizing an endless steel belt partially encircling a cooperating drum.

A still further object of the invention resides in the provision of a novel and improved device embodying means for applying pressure to successive, overlapping portions of a belt-like article being formed as it passes between a drum and a cooperating endless steel belt so that the resultant article will have uniform contour throughout its length.

The above and other objects will become more apparent from the following description and accompanying drawings forming part of this application.

Figure 1:
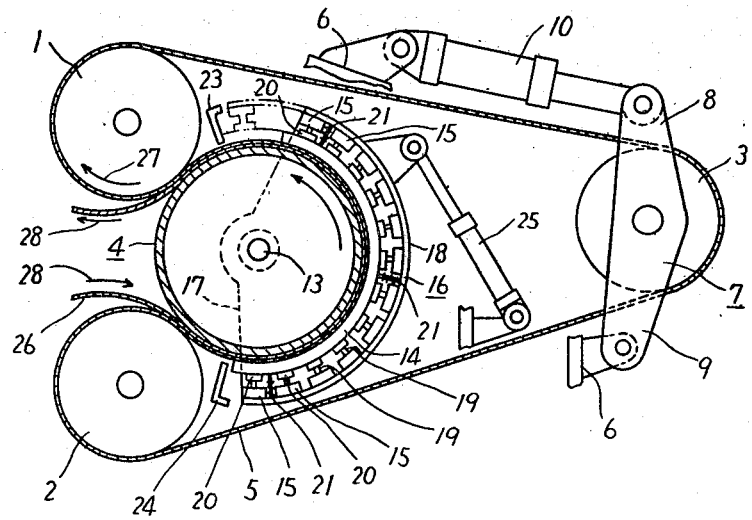

In the drawings:
FIGURE 1 is a side elevational view in partial section of a novel and improved structure in accordance with the invention; and
FIGURE 2 is a fragmentary cross-sectional view of the rotary drum and pressing mechanism shown in FIGURE 1.

In accordance with the invention, at least three drums are provided for carrying an endless belt with at least one of the drums engaging the outer side of the endless belt so that an article to be treated can be passed between the drum and the belt in order to subject it to pressure. The last said drum is provided with a so-called pressure plate disposed about the outer periphery thereof and adapted to engage the endless belt and urge it tightly against the drum. If desired, the pressure plate as well as the cooperating drum may include heating means for heating the article being compressed between the endless belt and the drum. In accordance with the instant invention, it is preferable to arrange the pressure plate in the form of an arc and at the same time provide means for angularly moving the pressure plate with the endless belt and coaxially of the drum. Thus, the so-called pressure plate will move through a predetermined arc whereupon it may be retracted to the starting position and again move with the endless belt so that successive portions of the article being treated will be subjected to pressure from said plate and if the arcuate length of the pressure plate is greater than the arcuate displacement then the article passing between the endless belt and the cooperating drum will be uniformly treated throughout its length. Thus, assuming that the pressure plate actually includes a plurality of pressure exerting devices for exerting pressure on the plate and retracting it away from the belt, the pressure plate together with the pressure exerting devices can be operated to compress the article passing between the belt and the drum, and, at the same time, rotate with the drum through a predetermined angle. Thereupon operation of the pressure exerting devices to retract the pressure plate will permit the entire assembly to be moved to its original position and again exert pressure on said endless belt. In this way, the article passing between the belt and the drum is continuously and uniformly treated and the resultant article will have uniform contour.

More specifically and with reference to the figures, the illustrated embodiment of the invention involves three drums, 1, 2 and 3, arranged to form essentially an isosceles triangle. A fourth drum 4 is disposed within the triangle and in close proximity to the drums 1 and 2. An endless steel belt 5 passes about drums 1, 3 and 2 and thence about the drum 4. The drum 1 is pivotally supported by a suitable frame that may be similar to the frame 6 illustrated in FIGURE 2 and is provided with suitable driving means to forcibly rotate the belt as well as the rollers 2, 3 and 4. The drum 2 is similarly supported while the drum 3 is carried by a pair of arms 7. The bottom section 9 of each arm being pivotally secured to the frame 6, while the upper section 8 is pivotally connected through a hydraulic cylinder 10 to the frame 6. With this arrangement, operation of the hydraulic cylinder 10 will place belt 5 under tension.

Figure 2:
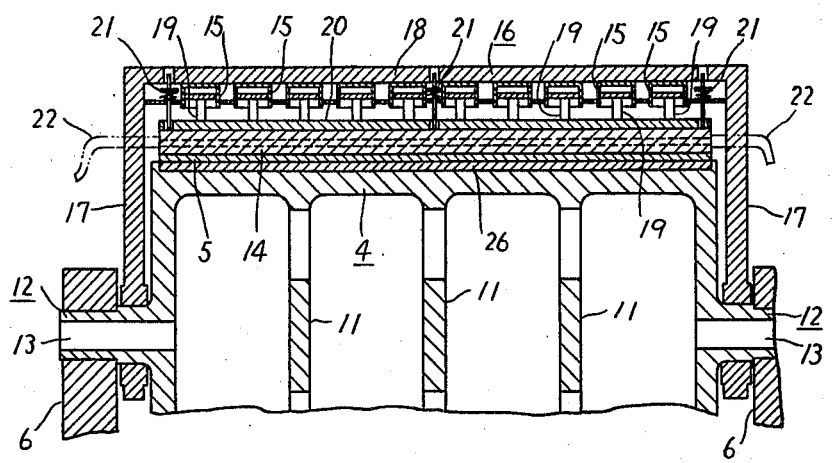

The rotary drum 4 is of hollow configuration, as illustrated in FIGURE 2, and has a plurality of ribs 11. Each rib is provided with openings so that a fluid may be introduced through one opening 13 into the drum and discharged through a second opening 13. The openings 13 are formed in the bearing shafts 12 which are carried by the frame 6. In this way, the drum 4 can either be heated or cooled as desired.

The pressure place and associated mechanism partially encircles the drum 4. This pressure mechanism includes a pressure plate 14 having a mesh-like internal structure with a plurality of openings extending therethrough for introducing heating or cooling fluid as may be desired. Surrounding the pressure plate 14 are a plurality of oil pressure cylinders 15 for urging the pressure plate against the belt 5. The pressure cylinders are carried by an arcuate supporting structure 16 having a curved plate 18 carried by fan-shaped side plates 17 which are supported for coaxial movement with the drum 4. The oil pressure cylinders 16 are fixed to the curved plate 18 and each of the piston rods 19 of the oil pressure cylinders 15 are connected to transverse elements 20 arranged in substantial parallel relationship and adapted to apply pressure to the plate 14. The plate 14 is coupled by means of springs 21 to the curved plate 18 so that when oil pressure is not applied to the cylinders 15, the plate 14 will move away from the belt 5. Tubes 22 coupled to the plate 14 are utilized for the passage of fluid through the plate in order to heat or cool it, as may be desired.

The pressure assembly 16 has an arcuate length less than the distance between a pair of stops 23 and 24 carried by the frame 6 and is provided with a hydraulic cylinder 25 coupled between the structure 16 and the frame 6. The cylinder 25 operates to retract the structure 16 whereupon pressure is applied to the hydraulic cylinders 15 causing the structure 16 to move counterclockwise with the drum 4. When the structure 16 contacts the stop 23, pressure is automatically removed from the cylinders 15 and the cylinder 25 is actuated to retract the structure 16 to repeat the operation.

In order to vulcanize a rubber belt, for example, using the continuous pressure treatment in accordance with the invention, a heated liquid is passed through the drum 4, as previously described, and similarly heated liquid is fed into the pressure plate 14 so that both the plate 14 and the drum 4 are maintained at a temperature suitable for vulcanization. A nonvulcanized belt 26 is then fed between the rotary drum 4 and the belt 5 and the hydraulic cylinder 10 is then operated to apply adequate tension on the belt 5 to compress the nonvulcanized belt 26. Thereafter the drum 1 is driven in the direction of the arrow 27. When the pressure mechanism 16 is in the position shown in solid lines in FIGURE 1, the oil pressure cylinders 15 are operated to urge the plate 14 against the belt 5 and thereby provide additional pressure to the nonvulcanized belt 26. The plate 14 upon being pressed against the endless belt 5 moves with the belt to a position shown in dotted outline in FIGURE 1 and abuts the stop 23. At this time, the oil pressure cylinders 15 are operated to retract the beams 20 and thereby permit retraction of the plate 14 by reason of the action of the springs 21. The entire structure 16 is then returned to the position shown in the solid outline by operation of the hydraulic cylinder 25. As soon as the structure 16 abuts the stop 24, the oil pressure is removed from the cylinder 25 and oil pressure is applied to the cylinders 15 to repeat the operation. The rate of rotation of the drum 4 is selected in accordance with the nature of the article being treated, vulcanized and shaped, and the article is produced continuously.

With the foregoing arrangement, articles being treated are subjected to a continuous pressure of about 5 kg./cm.² by the continuous steel belt and are subjected to an additional pressure by reason of the structure 16 which may be as high as 20 kg./cm.² or greater. Furthermore, heat can be applied to both sides of the article being treated and thus effect substantially uniform heating. Accordingly, when a rubber belt is being formed of a plurality of layers, excellent bonding of the layers is obtained and the finished product has precise contour and dimensions. The co-called intermittent pressure is especially effective in removing air bubbles contained in the article being treated and a product of superior quality to those manufactured with conventional devices is obtained.

While the invention is particularly useful in vulcanization of rubber, it can also be used to continuously treat synthetic resins, such as polyvinyl chloride, by shaping the material under pressure and at the same time cooling it by the passage of coolants through both the cylinder 4 as well as the pressure plate 14.

In the foregoing embodiment of the invention, the return mechanism of the structure 16 can be omitted, in which case the drum 4 would be rotated intermittently. Thus pressure would be applied by the plate 14 when the drum 4 is stopped and the pressure plate 14 would be moved away from the drum 4 to permit rotation of the drum 4 to bring the next section of the belt 26 into position for compression. It is also evident, however, that in place of oil for operating the cylinders 10, 15 and 25, water or other liquid may also be utilized.

While only certain embodiments of the invention have been illustrated and described, it is apparent that alterations, modifications and changes may be made without departing from the true scope or spirit of the invention as defined by the appended claims.

What is claimed is:

1. A device for continuously treating belt-like articles comprising a rotary drum, an endless belt encircling at least an arcuate portion of said drum and including means for applying tension thereto, an arcuate pressure plate associated with said drum and overlying at least part of that portion of the belt encircling said drum, means supporting said pressure plate for movement through a selected angle from one position to another position, means for urging said pressure plate against said belt and drum when in said one position and releasing said pressure when in said other position and means for moving said pressure plate from said other position to said one position when said pressure plate is released whereby a belt-like article continuously fed between said belt and drum will be subjected to the combined pressure of said belt and pressure plate.

2. A device for continuously treating belt-like articles according to claim 1 wherein said drum and pressure plate are hollow and include means for introducing a fluid medium for thermally treating said article while being subjected to said combined pressure.

3. A device for continuously treating belt-like articles according to claim 2 wherein said pressure plate includes a mesh-like internal structure for the circulation of fluid therethrough.

4. A device for continuously treating belt-like articles according to claim 1 including a plurality of belt supporting drum with at least one of said drums being movably supported and means for displacing the last said drum to stress said belt and cause it to forcibly engage the said rotary drum.

5. A device for continuously treating belt-like articles according to claim 1 wherein said pressure exerting members comprise hydraulically operated pistons.

References Cited

UNITED STATES PATENTS

| 2,110,076 | 3/1938 | Bierer | 18—6 |
| 2,182,168 | 12/1939 | Bierer | 18—6 |
| 2,182,317 | 12/1939 | Knowland | 18—6 |
| 2,351,861 | 6/1944 | Knowland et al. | 18—6 XR |
| 2,442,443 | 6/1948 | Swallow | 18—6 |
| 3,032,811 | 5/1962 | Knowland et al. | 18—6 |

WILLIAM J. STEPHENSON, Primary Examiner